June 16, 1964
L. R. BOSCH
3,137,604
HONEYCOMB STRUCTURE AND PROCESS OF MANUFACTURE
Filed July 12, 1960
2 Sheets-Sheet 1
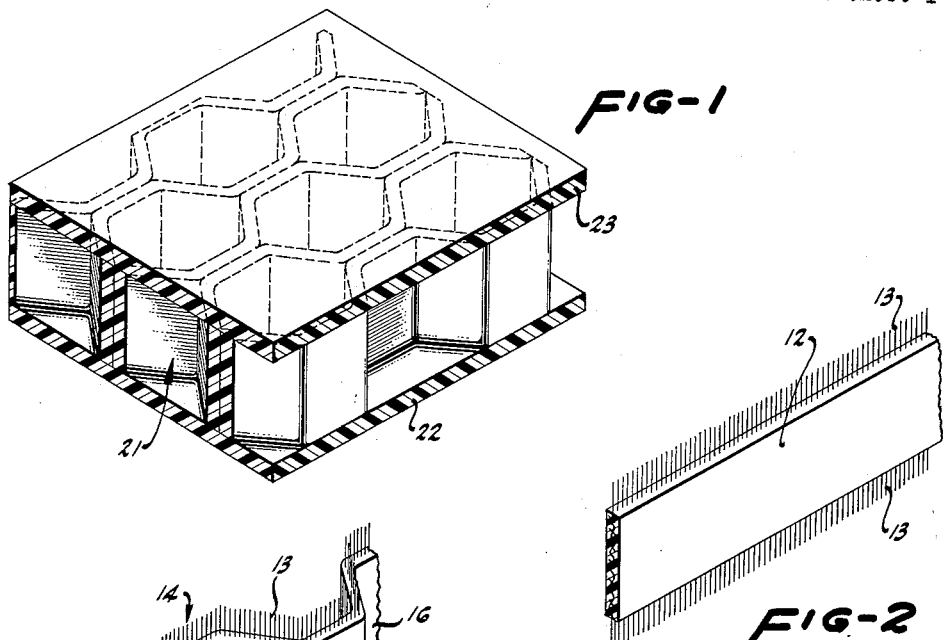
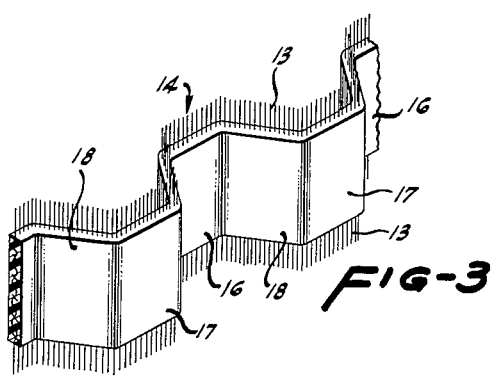
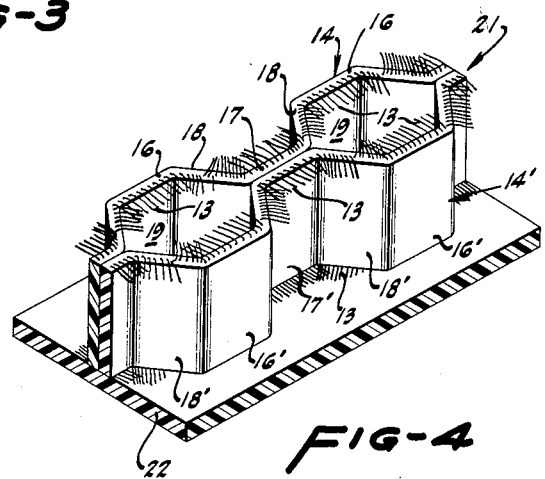
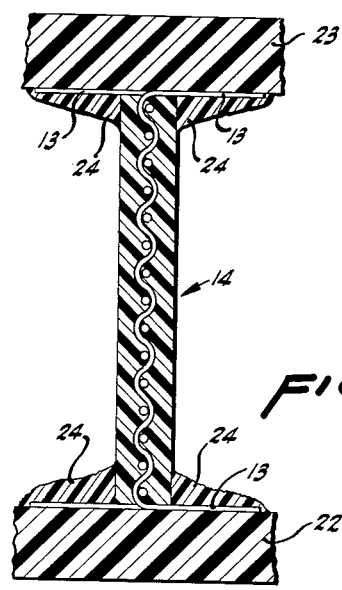
INVENTOR.
LAWRENCE R. BOSCH
BY
Lippincott, Ralls & Hendrickson
ATTORNEYS June 16, 1964   L. R. BOSCH   3,137,604
HONEYCOMB STRUCTURE AND PROCESS OF MANUFACTURE
Filed July 12, 1960   2 Sheets-Sheet 2
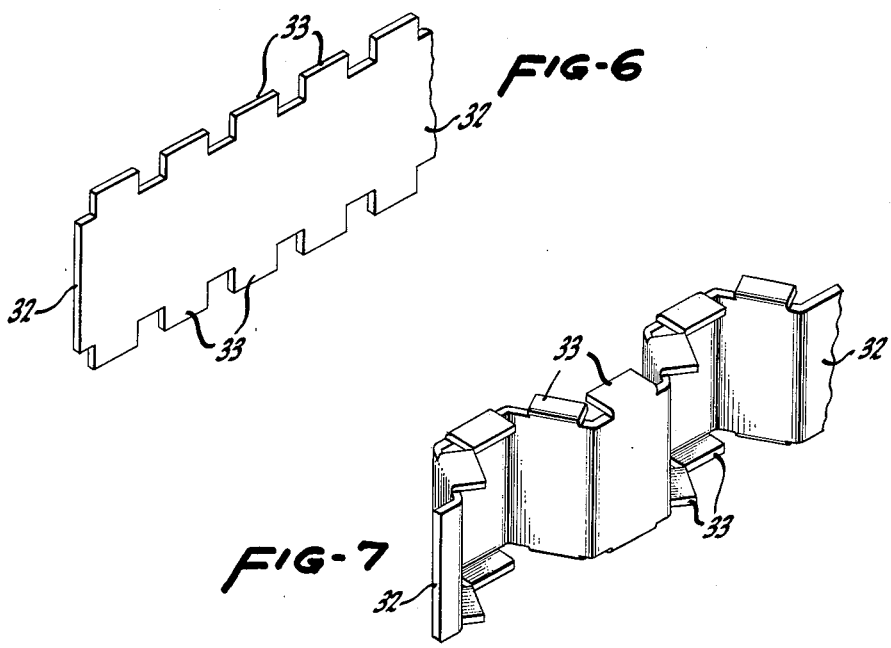
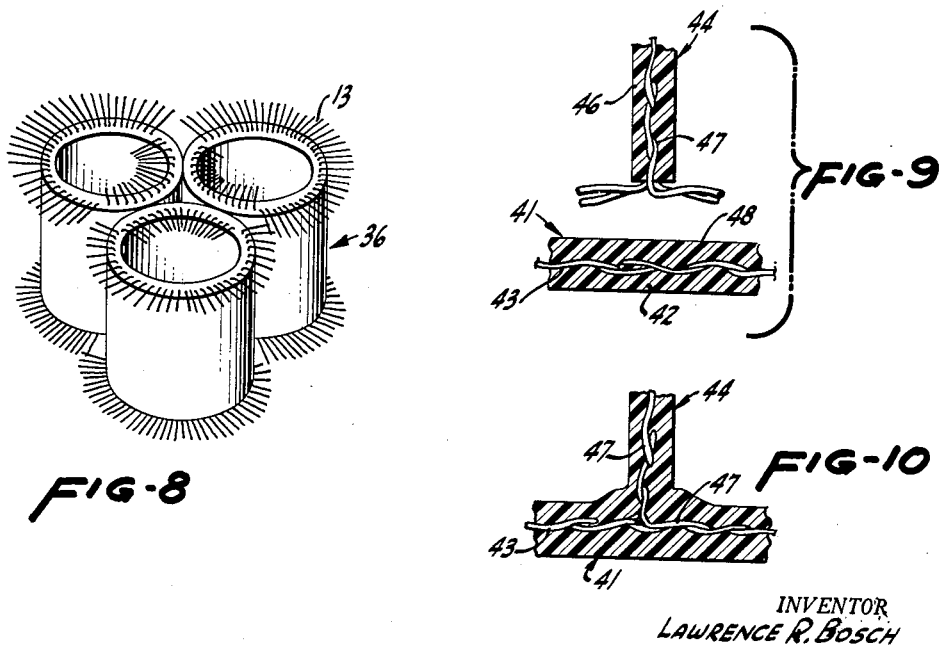
INVENTOR
LAWRENCE R. BOSCH
BY
Lippincott, Ralls & Hendrickson
ATTORNEYS

United States Patent Office 3,137,604
Patented June 16, 1964

3,137,604
HONEYCOMB STRUCTURE AND PROCESS
OF MANUFACTURE
Lawrence R. Bosch, 3561 Somerset Ave., Castro Valley, Calif., assignor of one-fourth to Michael C. Bosch, Castro Valley, Calif., and one-fourth to John W. Ralls and Alvin E. Hendricson, both of San Francisco, Calif.
Filed July 12, 1960, Ser. No. 42,387
5 Claims. (Cl. 156—197)

The present invention relates to an improved light weight structural member of the honeycomb sandwich type and to a process of manufacturing such members.

It is well known that structural members may be formed by particular combinations of light weight and relatively weak elements joined together to form a unitary member having very substantial strength. In this respect there have been developed honeycomb structures wherein a central core of honeycomb configuration is provided between a pair of rigid sheets or skins to achieve a sandwich member that exhibits remarkable compression strength. By the utilization of core material such as paper or cloth, suitably impregnated, it is possible to produce honeycomb structures of very light weight which exhibit structural properties that are commensurate with those of more conventional structural materials, such as the metals. These honeycomb elements are commonly designed to accommodate compression forces applied over a substantial area of the skin thereof. The columnar configuration of the core serves to provide very substantial strength when the sandwich is subjected to such compressive forces. In the development and design of structural members of this type, it has been relatively axiomatic that the individual portions of the overall structure need not have great structural strength, but that the ultimate strength of the composite unit shall be provided by the multiplicity of the individual elements forming same. It is only in combination then that conventional honeycomb structure elements provide the substantial strength required for the applications to which same are put.

Certain disadvantages are known to attach to conventional honeycomb structural members, and in this respect one grave difficulty often encountered is the low peel strength of such members. By peel strength it is herein meant the strength of adhesion of the skin to the core of the structural member. The edge joinder of core elements to a flat skin is quite suitable to transmit compressive forces between the skin and core, however, it is not suited to providing substantial resistance to the removal or peel-back of the skin. A further disadvantage of conventional honeycomb structures is the low resistance of same to concentrated lateral forces, and in this respect it is common to employ structurally strong edge members about the sandwich, in order to prevent rupture of core elements from transverse forces. It has been found that the force applied transversely to a core edge will serve not only to rupture an individual core element, but also to produce progressive rupture of core elements through the sandwich so as to thereby substantially destroy the structural integrity of the element. Certain shear forces are also destructive of conventional honeycomb structures, inasmuch as the core walls and bonding of skin to core are not suitable to sufficiently resist such forces.

The present invention provides an improved honeycomb structure wherein a very materially enhanced and improved bonding of the core and skin is achieved. In the present invention reliance is not placed upon bonding between a flat surface and edges of members such as core walls, but instead, there is herein provided for the bonding of skin to very substantial areas of core components. In this manner the present invention provides a very substantial peel strength, and destruction tests of honeycomb structure of the type hereinafter disclosed have shown that even with oversized skin elements a fracture of the skin element itself occurs before destruction of the bond between such skin and the core of the honeycomb sandwich. Additionally, the honeycomb structure of the present invention provides a very substantial structural strength in opposition to transverse forces either localized or general. The structure hereof provides substantially the same structural strength against localized lateral or transverse forces applied to an edge of the core as is provided against compressive forces upon the honeycomb skin. Furthermore, excessive forces which may serve to rupture an individual core wall will not herein produce progressive rupture of core cells or elements, in direct contrast to conventional honeycomb structures.

The present invention further provides an improved process of forming honeycomb sandwich structures. In accordance herewith, the core of the structure is formed of a plurality of elongated strips which are pre-bent or formed, and which are then joined together to form the integral core. It is possible in this manner to provide a continuous process for producing honeycomb cores, and this again is a material advance over more conventional methods of manufacture wherein batch processing is required, as each core is separately and preferably automatically produced without relation to other cores so that handling of the core material and core structure before attachment of same between the skins of the sandwich becomes unnecessary. Inasmuch as many core structures are by themselves quite fragile and susceptible to structural damage before attachment of the skins thereto, this has proven to be a substantial advantage. It is further provided as a part of the process hereof that the core structure shall be formed with lateral extensions overlaying, at least in part, the core openings, and provided for the purpose of materially enhancing the bonding of the core to the skin of the resultant structure.

By the provision of lateral core-wall extensions, it will be appreciated that the area of bonding between the core and skins is very substantially increased. In clear distinction to conventional attachment methods wherein an end joinder of core walls with a skin placed thereon is relied upon to provide structure strength, the present invention provides a very substantial area of core material in direct contact with the inner surface of the skin for bonding thereto. This then provides a substantially improved attachment of skin and core, so that removal of the skin from the core is virtually impossible within the structural limits of the individual portions of the member, and furthermore, provides materially enhanced resistance to lateral shear forces, inasmuch as almost total destruction of the honeycomb structure is required before failure under transverse forces is possible. It is further contemplated herein that the individual walls of the core and the individual hollow columns defined thereby, may be substantially larger than those employed in conventional practice. By the utilization of core walls of relatively substantial dimensions, it is herein possible to provide a substantial resistance to localized transverse forces, which may be applied to the core itself. Contrary to more conventional approaches to the problems of producing honeycomb sandwich members, the present invention in one aspect thereof provides for the utilization of relatively structurally strong core walls together with an increase in the size of hollow core columns. The end result of this novel approach is a honeycomb sandwich having substantially the same weight per unit volume as conventional structures of this type, and yet having very materially improved structural properties.

It is an object of the present invention to provide an improved high strength honeycomb structure.

It is another object of the present invention to provide an improved light weight structural member having a honeycomb core configuration bonded over extended core surfaces to skins sandwiching the core for maximum structural strength.

It is a further object of the present invention to provide an improved light weight structural member including a honeycombed core with rigid skin surfaces, wherein individual core walls have substantial structural strength in a transverse direction, and wherein lateral core-wall extensions are directly bonded to the skin for maximum skin adhesion.

Yet another object of the present invention is to provide an improved process of manufacturing structural members having a honeycomb core, and providing a continuous process for core production.

A still further object of the present invention is to provide an improved process of manufacturing honeycomb sandwich structural members wherein a materially enhanced bonding of the honeycomb core and exterior skin is achieved.

Various other objects and advantages of the present invention will become apparent to those skilled in the art from the following description of a single preferred embodiment of the structure hereof and steps of the process of the present invention. It is not intended to limit the present invention by the terms of the following disclosure, but instead, reference is made to the appended claims for a precise delineation of the true scope of the present invention.

The present invention is illustrated in the accompanying drawings, wherein:

FIG. 1 is a perspective view of a portion of a honeycomb sandwich structural member, in accordance with the present invention;

FIG. 2 is a perspective view of a core wall strip during an initial stage of manufacture thereof;

FIG. 3 is a perspective view of a single core wall during the process of manufacture of the present invention;

FIG. 4 is a perspective view of a pair of core walls joined together and to the lower skin of the honeycomb sandwich hereof, in accordance with the process of this invention;

FIG. 5 is an enlarged transverse sectional view illustrating the joinder of a single core wall to the skins of a honeycomb sandwich structural member;

FIG. 6 is a perspective view of an alternative core wall strip during an initial stage of the process hereof;

FIG. 7 is a perspective view of a part of a core wall formed from the strip of FIG. 6;

FIG. 8 is a perspective view of a part of an alternative core structure;

FIG. 9 is a fragmentary view of core wall and skin during an early stage of bonding between core and skin in accordance with one alternative of the process hereof;

FIG. 10 is a fragmentary view of the core wall and skin of FIG. 9 after bonding.

Considering first the improved process of the present invention, and referring to the drawings, there is first herein produced a plurality of elongated strips 12, as illustrated in FIG. 2, and adapted to become individual walls of a honeycomb core. These strips may be initially constituted of a flexible material such as paper, or fibreglass, or the like, and are impregnated with a suitable hardening agent, such as a thermosetting resin over the longitudinal length thereof. The edges of the strip 12 are, however, not impregnated so as to remain flexible. It will thus be seen that there are provided flexible upper and lower edges 13 on the strip 12. In the instance wherein a cloth, such as fibreglass cloth, is utilized as the starting material for the strip 12, the edges of the strip may be frayed so as to remove the longitudinal threads thereof, and in this instance the strip resembles that illustrated in FIG. 2. In the formation of the strip from a mixture of resin and glass fibers, for example, free fibers are provided along the edges.

In the process of manufacture, the strips 12 are, as noted above, hardened along the longitudinal center thereof to remain flexible along the longitudinal edges, and prior to complete hardening of the strips, same are bent to form successive half hexagons, such as illustrated in FIG. 3 of the drawings. This bending operation may be readily performed by passing the strip when in partially hardened form through mating cogs, or the like, and following this by further heating of the strip so as to fully set the hardening agent in the central portion of the strip. As will be seen in FIG. 3, there is thus produced from each of the strips 12, a single elongated wall 14. This wall 14 may be considered as having a succession of laterally offset wall portions 16 and 17 arranged in parallelism and connected by a slanted wall portion 18. There yet remains as a portion of the relatively rigid wall 14, the flexible edges 13, and these edges are adapted to be folded over in somewhat the manner illustrated in FIG. 4.

Joinder of a plurality of walls, such as that illustrated in FIG. 4, is herein accomplished to form a core section for the honeycomb sandwich of the present invention. There is shown in FIG. 4 only a portion of two adjacent walls 14 and 14', and it will be seen that joinder is accomplished by offsetting the two walls longitudinally thereof a distance equal to the longitudinal extent of an inclined wall portion 18 and one wall portion 16. In this manner then, the two walls 14 and 14' fit together so that wall portions 16 and 16' abut and next adjacent inclined wall portions 18 and 18' extend away from each other, so as to define with successive wall portions an hexagonal opening or hollow pillar 19. The abutting wall portions 16 and 16' are affixed together as by the utilization of a bonding agent which may, in the above-described example, comprise a thermosetting resin. Alternatively, mechanical connection of the wall portions 16 and 16' may be employed.

Following joinder of a large plurality of walls in the manner illustrated in FIG. 4 and described above, the core element 21 formed thereby is bonded to skin portions to complete the honeycomb sandwich. In the interests of clarity, there is illustrated in FIG. 4 only two adjacent walls joined together as a portion of a core 21, and disposed upon a single lower skin 22. Further to the process of the present invention, the flexible core wall edges 13 are bent laterally of the core walls in somewhat the manner illustrated in FIG. 4 to thereby lie upon the inner surface of the sheet 22. In this position there is applied to the skin upon the upper surface thereof, a bonding agent such as, for example, a resin, or the like, serving to thereby bond the lower edges of the core walls to the lower skin 22, and also to bond the flexible edges 13 of these core walls to the lower skin. In clear distinction to more conventional processing wherein only rigid lower edges of the core wall are provided for bonding to a skin, the present invention provides lateral extensions as, for example, in the form of threads, or the like, extending as flexible edge portions 13 to afford a very substantial bonding area between the skin and the core wall. This is further illustrated in FIG. 5 where there is shown a single core wall 14 having the flexible edges 13 thereof bent outwardly relatively normal to the wall 14, and resting against the inner surfaces of the lower skin 22 and upper skin 23. The application of a bonding agent, such as a resin, indicated at 24, will thus be seen to provide for attachment of a very substantial area of the core wall at 13 to the inner surfaces of the skins 22 and 23. In this respect, please note that the lateral core wall extensions 13 form an integral part of the core wall, and are not readily separated therefrom. Consequently, there is herein provided a materially improved bonding between the skin and core wall for, as may be seen in FIG. 5, a very substantial multiplication of the available bonding area is provided over that which is available by the rigid core edge alone.

As an alternative to the utilization of impregnated cloth, or the like, disclosed above, there may be employed material such as paper from which the core structure is formed. Thus, as illustrated in FIG. 6, there are formed elongated strips 32 of paper, or the like, which are suitably impregnated as by passage through a resin bath with the lateral strip edges being further operated upon so as to form tabs 33 along the strip edges. This lateral edge operation may be accomplished by preventing the edges from entering the bath so that no resin impregnates same, and consequently, so that the edges remain flexible or, alternatively, the edges may also be impregnated and laterally cut or sliced so as to form individually movable tabs along the edges. These tabs are then bent laterally outward of the strip while in a flexible state, so that they are available for engaging the flat surface of a honeycomb structure skin. It will be appreciated that the lateral strip edges may be notched, as illustrated in FIG. 6, or merely cut, so that the separate tabs 33 may be bent in opposite directions as desired. As illustrated in FIG. 7, the individual strips described above are further operated upon while in a relatively flexible condition, so as to form individual core walls. This operation may take the same form as that described above, with the addition of the further step of bending over the tabs in the manner illustrated in FIG. 7 so that they extend alternately on opposite sides of the individual wall. These offset walls may then be joined together to form an hexagonal structure, such as that illustrated in FIG. 4, for example, and the resultant core structure then bonded to skins on opposite sides of the core to form the final sandwich configuration. The laterally extending tabs 33 along each of the wall portions will be seen to provide a maximized contact area between the core walls and skin to be attached thereto, so that there is provided in this process for the attainment of the objects of the present invention, wherein edge joinder of core and skin are obviated.

It will be appreciated that the core structure described above in actuality comprises a plurality of interconnected columns with sandwich skin closing the ends thereof. This columnar configuration may be alternatively produced in accordance with the present invention by the establishment of individual columnar elements in contrast to the continuous wall structure above described. Thus, as illustrated in FIG. 8, it will be seen that the individual strips 12 may be successively formed into cylinders 36 with flexible or laterally extended edges 13 about each end of each of such cylinders. The cylinders are then joined together between a pair of skins so as to form a sandwich structure which has substantially the same resultant properties as the structure indicated above. Certain advantages attached to the utilization of the last-mentioned processing, wherein individual cylindrical or other type of separate columns are formed and joined together into the core structure. Thus, for example, with particular processing machinery, it is advantageous to utilize a large plurality of separate elements which are joined together to form the core structure, rather than utilizing a lesser number of elongated wall members, as first described herein. With regard to the actual joinder of the core cylinders and sandwich skins, it will be appreciated that the core structure may either be joined together by suitable bonding agents or, alternatively, by mechanical means. Furthermore, it is noted that the attachment of separate core columns to each other may be accomplished at the same time as the elements are joined to the skins of the sandwich. This provides further advantage for particular processing operations.

With regard to the attainment of an ultimate adhesion between the sandwich core and the skins thereof, there may be employed, in accordance with the present invention, a wet laminate joinder of such skins and core. This is schematically illustrated in FIGS. 9 and 10, wherein the material of the skin 41 comprises a plastic 42 having fibers 43 extending therethrough. The illustrated wall portion 44 of the core structure is likewise formed of a plastic 46, having fibers 47 therein. In accordance with the above description of the process of this invention, the core wall 44 has the edges thereof formed in a flexible manner so that same may be extended laterally outward somewhat at the joinder of the core and skin for maximized contact between same. As illustrated in FIG. 9, the ends of the fibers 47 will be seen to extend beyond the plastic impregnation of the wall. As a part of the operation of joining the core wall 44 with the skin 41, at least the upper surface 48 of the latter is softened as by the utilization of a solvent or, alternatively, is provided in a softened condition prior to initial hardening of the plastic 42 of the skin. The core wall 44 is then forced downwardly onto this supper surface of the skin, so as to penetrate the surface, and consequently, to force the ends of the core wall fibers 47 into the interior of the skin 42. This results in an actual intertwining the fibers of the core wall and the fibers of the skin, as illustrated in FIG. 10, so that upon hardening of the skin there is produced a substantially integral structure wherein a relatively continuous fiber interconnection is provided between core wall and skin, and furthermore, wherein the plastic materials of the core wall and skin are joined together into substantially a single unit. This wet laminate joinder of core and skin produces a maximum strength of connection. In direct contrast to conventional operations in the manufacture of honeycomb sandwiches, the product resulting herefrom is substantially indestructable insofar as the joint between core and skin.

The process of the invention as set forth above, will be seen to be admirably suited to continuous flow manufacture, as contrasted to batch processing. By the manufacture in accordance herewith of core strips or individual core columns, it is quite easy to produce honeycomb cores without the necessity of extensive handling or sawing operations, as are conventionally required in prior-art processes. Each individual core may be separately formed in the process hereof and then readily joined to a pair of sandwich skins, so that it is no longer necessary to manufacture an extensive core structure which is then subsequently divided into individual cores for later joinder into a sandwich structure. Not only does the present invention provide for a material simplification in honeycomb structure manufacture, but furthermore, provides for the material improvement in the resultant structure.

Considering now the improved honeycomb structure of the present invention, and referring in this respect to FIG. 1 of the drawings, there will be seen to be shown a structure including a pair of flat rigid sheets, or skins 22 and 23, disposed upon opposite sides of a honeycomb core 21. The physical structure of the member illustrated in FIG. 1 includes the attachment means shown in FIG. 5. Thus, the individual core walls of the core 21 are affixed to the skins 22 and 23 by lateral core-wall extensions lying against the inner surfaces of the skins and bonded thereto by suitable bonding means whereby the individual core walls are firmly affixed to the skins. In addition to the foregoing, the physical structure of the honeycomb sandwich of the present invention provides for the utilization of core columns of substantially greater size than has hitherto been employed in the art. In distinction to more conventional approaches to the problem of providing light weight structural members, wherein it is conventional to utilize physically weak elements as the components of the overall member, the present invention provides for the utilization of relatively strong components. In order to maintain the required light weight of the resultant unit, the present invention provides for the utilization of much larger columns such as hexagonal pillars in the core of the sandwich. While it is recognized that an ideal honeycomb sandwich provides a skin having the same strength as the core, it is conventional to use a much stronger skin in order to prevent local puncture thereof by the application of localized forces to the skin. The present invention approaches the ideal honeycomb structure much more closely than does conventional structures of this type by the utilization of stronger core walls, so that the relatively strong outer skin yet provides protection from local puncture and, at the same time, the strength of the core approaches that of the skin. In this respect, it is contemplated that the individual columns of the core may be some four or more times as large as those conventionally employed. As an example of a honeycomb sandwich structure formed in accordance with the present invention, the following dimensions are exemplary; overall sandwich depth 24 millimeters; core height 18 millimeters; skin thickness 3 millimeters; core wall thickness one-half millimeter; individual core-wall portions 14 millimeters in length.

The above honeycomb structure example provides a honeycomb pillar of regular hexagonal configuration, having a length of about 28 millimeters and a width of about 24 millimeters, so that a block of structural material would have about four hexagonal pillars for every three and one-half inches of length. In general, the present invention provides in the structure thereof, a sandwich core wherein the hexagonal pillars have cross-sectional dimensions of the order of the length of such pillars.

A structural member formed in accordance with the process of the present invention, and substantially as illustrated in FIG. 1 of the drawings, was subjected to severe tests to verify the expected physical properties thereof. Of particular interest in this respect is the peel strength of the honeycomb sandwich, formed in accordance with the present invention, for the application of a peeling force to a skin of the sandwich tending to break away the skin or to peel same off of the sandwich resulted in the ultimate destruction of the skin upon which the force was applied, without damage to the bond between the skin and core. Further tests included the application of localized forces transversely of the honeycomb sandwich upon the edge of the core, and compression forces applied in this manner with a sufficient magnitude to rupture a single core wall did not serve to produce progressive rupture through the sandwich, nor did it serve to in any way loosen the core from the skins or to otherwise impair the structural integrity of the sandwich. The application of shear forces to a test sandwich, in accordance with the present invention, by applying the lateral force in one direction to an edge of the upper skin and a lateral force in the opposite direction to an opposite edge of the lower skin, produced no physical damage to the sandwich with forces approaching the maximum compression force that the sandwich could withstand. In comparison with conventional and commercially available honeycomb structural members, the present invention is noted to have a similar weight-to-volume ratio and to exhibit similar resistance to compressive forces applied normal to the skins thereof. With respect to all other types of forces applied to the sandwich, same exhibits remarkably superior characteristics.

Only relatively low order forces applied transversely or laterally to conventional honeycomb sandwich structures will suffice to very substantially damage same and to, in fact, produce progressive rupture which will eventually thoroughly destroy the sandwich. In the absence of structurally strong edging about conventional sandwich structures, only very slight localized lateral forces upon the core will serve to puncture same and to produce progressive rupture of successive core cells, so as to destroy the sandwich. Likewise, the application of shear forces will serve to cause the sandwich to collapse, in clear distinction to the present invention where substantially no physical damage can be noted from the application of such forces.

It will thus be seen that the present invention provides a materially improved honeycomb sandwich structure highly suited for use as a structural element having all of the advantages of prior-art elements of this type, and further affording substantial advantages above and beyond those available with prior-art elements. In addition, the present invention provides an improved process for manufacturing honeycomb structures wherein a substantially reduced cost of manufacture is attained without a corresponding reduction in quality or strength of the finished product.

What is claimed is:

1. A process of manufacturing honeycomb structures comprising forming a plurality of light rigid strips with regularly spaced oppositely offset portions with perpendicular edge extensions disposed in opposite directions along alternate portions of each strip, positioning a plurality of strips in adjacent staggered side-by-side relationship and bonding same together to form a core defining openings therethrough with said edge portions extending inwardly of each opening about same bonding a rigid skin upon each side of said core in closing relation to the core openings and in intimate contact with the edge extension of said strips.

2. A process of manufacture comprising the steps of forming elongated strips of a flexible material, bending said strips into a succession of half hexagons, impregnating said strips with hardening means for forming rigid walls, laterally bending the longitudinal edges of said strips to overlay indentations of the strips prior to any hardening of the strip edges, joining together a plurality of said impregnated strips in side-by-side relation to form a honeycomb core defining hexagonal openings transversely therethrough with said edges extending laterally of the strip edges inwardly of each of the openings in at least partially closing relation to said openings, and bonding a pair of rigid skins to said core with one on each side thereof across said openings and fully contacting said strip edges to form a rigid unitary honeycomb structural member.

3. An improved process of forming light weight rigid structural members comprising the steps of forming elongated strips of flexible material, hardening the center of said strips while retaining the longitudinal edges thereof flexible, and forming said strips into rigid walls of successive oppositely-offset portions defining half hexagons, bonding together a plurality of said strips in staggered side-by-side relation to form a core with hexagonal openings therethrough and flexible edges along each of the walls thereof, and bonding a rigid skin to each side of said core at the flexible edges thereof by applying a bonding agent fixing the flexible core wall edges into the skin for maximized bonding between the skins and core to form a honeycomb sandwich of high structural strength.

4. A process as set forth in claim 3 further defined by forming said strips of cloth, hardening said cloth by applying a fluid resin to the central portion only thereof and hardening same while retaining the strip edges substantially free of resin to retain flexibility thereof, fraying the strip edges to leave substantially only transverse threads of the strip cloth, and bonding said skins to said core by applying a fluid resin to same and to the frayed strip edges to fully bond such edges into the skin and provide a very high strength bond between skin and core.

5. A process of manufacturing honeycomb sandwich structures comprising the steps of forming a plurality of core walls of a material having fibers impregnated therein while freeing the fibers along the wall edges to flexibly extend therefrom, joining together a plurality of said core walls into a core to define a plurality of hollow columns therethrough, said columns having a length substantially equal to their width, applying to the core ends along the core wall edges sheets of material having fibers impregnated therein by maintaining the sheet impregnation soft at least upon the surfaces adjacent the core while pressing the sheets and core together to intermingle the core wall fibers with those of the sheets and hardening the sheets to bond same to said core with maximized bonding strength.

References Cited in the file of this patent

UNITED STATES PATENTS 2,477,852    Bacon _____ Aug. 2, 1949

FOREIGN PATENTS 1,011,146    France _____ June 19, 1952